US005968654A

United States Patent [19]

Sawan et al.

[11] Patent Number: 5,968,654

[45] Date of Patent: Oct. 19, 1999

[54] MODIFICATION OF POLYMERIC SUBSTRATES USING DENSE OR LIQUIFIED GASES

[75] Inventors: Samuel P. Sawan, Tyngsborough, Mass.; W. Dale Spall, Los Alamos, N.Mex.; Hung Chang Lee, Lowell, Mass.

[73] Assignee: University of Massachusetts Lowell, Lowell, Mass.

[21] Appl. No.: 08/713,156

[22] Filed: Sep. 12, 1996

[51] Int. Cl.[6] .............................. B32B 7/04; B32B 31/06; B32B 27/00

[52] U.S. Cl. ....................... 428/420; 428/421; 428/475.8; 428/476.1; 428/483; 427/302; 427/333; 427/372.2; 156/314; 156/319

[58] Field of Search .................................... 428/420, 421, 428/475.8, 476.1, 483; 156/314, 319; 427/302, 333, 372.2

[56] References Cited

U.S. PATENT DOCUMENTS

| | | | |
|---|---|---|---|
| 4,361,626 | 11/1982 | Boba | 428/420 |
| 4,508,781 | 4/1985 | Yagi | 428/409 |
| 4,557,945 | 12/1985 | Yagi | 427/575 |
| 4,844,855 | 7/1989 | Graete | 428/420 |
| 4,857,404 | 8/1989 | McCullough | 428/367 |
| 5,256,355 | 10/1993 | Kamotowski | 264/135 |

*Primary Examiner*—Leszek Kiliman
*Attorney, Agent, or Firm*—Hamilton, Brook, Smith & Reynolds, P.C.

[57] ABSTRACT

A method of modifying a polymeric substrate, such as polyethylene terephthalate and nylon 66, imparts water repellency and lubricity, and provides the additional benefit of reducing the soiling of fabrics. The method includes combining the polymeric substrate with a dense or liquified gas, such as carbon dioxide or sulfur hexafluoride, and a fluorinated compound, such as a fluorinated polyether.

38 Claims, No Drawings

MODIFICATION OF POLYMERIC SUBSTRATES USING DENSE OR LIQUIFIED GASES

GOVERNMENT FUNDING

This invention was sponsored by Grant No. 06-6604 from Los Alamos National Laboratory and the Government has certain rights to the invention.

BACKGROUND OF THE INVENTION

Polymers have a wide variety of uses. Among the most prevalent uses of polymers is in the manufacture of textiles and, in particular, garments.

Outer garments that are at least partially formed of polymer components, such as conventional plastic rain slickers, are still common. However, plastics generally are not permeable to water vapor and, consequently, perspiration typically accumulates unless the garments are adequately ventilated.

Fabrics that include polymeric fibers are an alternative to continuous plastic garment materials. Polymeric fibers can contribute to water repellency, and fabrics that are woven with polymeric fibers are permeable to water vapor. However, the water repellency of polymeric fabrics is often limited by the effect of the particular polymeric fibers on water that contacts the fabric. For example, contact between water or another liquid, and a solid, such as a polymeric fiber, causes an interfacial tension to occur between the liquid and solid. An interfacial tension also occurs between the surrounding gas and the liquid and between the surrounding gas and the solid. The combined effect of these interfacial tensions generally determines, at least partially, the degree of water repellency of a fabric. Specifically, the greater the interfacial tension between a liquid, such as water, and a polymeric fiber component of a fabric, relative to the interfacial tension between the liquid and a surrounding gas and between the solid and the surrounding gas, the more the fabric will tend to repel the liquid.

Many polymers that are suitable for manufacture of fabrics, such as polyethylene terephthalate and nylon 66, contribute only limited water repellency to garments that include such fabrics. Further, as garments wear and become soiled, wettability and consequent permeability of the garments to water often increases.

One attempt to increase the water repellency of garments is to apply to the surface of the garment a coating of a chemical compound, such as a perfluorinated polyether, fluorinated acrylate or some other compound that exhibits relatively high water repellency. Perfluorinated polyethers, for example, also have the benefit of reducing friction between the fabric and other objects, thereby reducing the rate of wear and the rate at which the garments become soiled. However, chemical coatings themselves typically wear away and must be reapplied. Further, chemical coatings can significantly diminish the permeability of fabrics to water vapor, thereby reducing the comfort and utility of garments that are made with such fabrics.

Therefore, a need exists for a material and a method of forming a material that overcomes or minimizes the above-mentioned problems.

SUMMARY OF THE INVENTION

The present invention relates to a method of modifying a polymeric substrate and to a polymeric composition formed by the method.

The method includes contacting a polymeric substrate with a fluorinated compound and dense gas resulting in the fluorinated compound binding to the polymeric substrate, thereby modifying the polymeric substrate.

The method further includes contacting a polymeric substrate with a fluorinated compound and a liquified composition that is a gas at room temperature and about 1 ATM.

The polymeric composition includes a polymeric substrate and a fluorinated compound that is chemically bound to the polymeric substrate.

This invention has many advantages. For example, the method of the invention causes a fluorinated compound to become bound to a polymeric substrate, thereby making the fluorinated compound more difficult to remove from the polymeric substrate. Further, modification of a suitable polymeric substrate, such as a polymeric fiber, can be conducted prior to incorporating the fiber into a fabric. Fabric may be treated before or after incorporation into a garment. Consequently, significant benefits that are to be achieved by incorporation of a fluorinated compound into a fabric can be obtained without requiring application of a fluorinated coating to the fabric itself. As a result, the permeability of the fabric is generally not significantly diminished by application of such coatings.

In addition, modification of a polymeric substrate by chemically binding the fluorinated compound to the substrate can significantly reduce the rate of wear of articles fabricated from the polymeric substrate by reducing the coefficient of friction at the substrate. The rate of loss of the fluorinated compound from the polymeric substrate will be substantially diminished as a consequence of chemically binding the fluorinated compound to the substrate. Further, the durability of articles manufactured from the polymeric substrate will be increased by chemically binding the fluorinated compound at a depth or depths beneath the surface of the polymeric substrate. of friction resulting from modification by the method of the invention, garments, in particular, generally will not accumulate dirt or wear as rapidly as garments that include untreated polymeric fiber components.

Physical properties of polymers can also be controlled by the method of the invention. For example, the amount of fluorinated compound chemically bound to the polymeric substrate can be controlled more accurately than by simply physically applying a fluorinated material to a polymeric surface. Other advantages of the present invention will be made apparent in the detailed description of the invention set forth below.

DETAILED DESCRIPTION OF THE INVENTION

The features and other details of the method and composition of the invention will now be more particularly described and pointed out in the claims. It will be understood that the particular embodiments of the invention are shown by way of illustration and not as limitations of the invention. The principal features of this invention may be employed in various embodiments without departing from the scope of the invention.

The invention generally relates to a method of modifying a polymeric substrate and to a polymeric composition that has been modified by the method of the invention. The method includes contacting a suitable polymeric substrate with a fluorinated compound and a dense gas that facilitates the binding of the fluorinated compound to the polymeric substrate. The method further includes contacting a suitable polymeric substrate with a fluorinated compound and a liquified composition that is a gas at room temperature and about 1 ATM. "Dense gas," as that term is employed herein, means a gas that is at a greater density than it would be at standard temperature and pressure, and includes a supercritical fluid. "Supercritical fluid," as that term is employed herein, means a dense gas that is maintained above its critical temperature which is the temperature above which it cannot be liquified by pressure. "Room Temperature" as that term is employed herein is between about 21 and about 24° C. "Fluorinated compound," as that term is employed herein, means a molecule with at least one covalently bonded fluorine atom. Binding of the fluorinated compound to the polymeric substrate modifies the polymeric substrate. In particular, binding of the fluorinated compound can modify the surface of the polymeric substrate. optionally, the polymeric substrate can be treated to form end groups of the polymer that can react with a fluorinated compound. Examples of polymeric chain ends that can react with a fluorinated compound include functional groups such as carboxyl, hydroxyl, amine, aldehyde, nitrile, isocyanate, mercaptan, and halogen functional groups. In one embodiment, reactive end groups are formed by exposing a polyethylene terephthalate or nylon 66 polymeric substrate to an acidic or basic aqueous solution. "Polyethylene terephthalate," as employed herein, is a thermoplastic polyester formed from ethylene glycol and dimethyl terephthalate. "Nylon 66," as used herein, is a condensation product of adipic acid and hexamethylenediamine. Examples of suitable solutions include a 0.05 weight percent aqueous solution of $CF_3COOH$ and a 0.05 weight percent aqueous solution of sodium hydroxide (NaOH). Preferably, the aqueous solution is boiling at atmospheric pressure during contact with the polymeric substrate. Also, the period of treatment of the polymeric substrate by contact with a boiling acidic or basic aqueous solution is sufficient to cause formation of polymeric chain ends that can react with a fluorinated compound. It should be appreciated that the aqueous solution can be replaced with nonaqueous acid or base reagents. The period of treatment will vary depending on the reagent used. Following treatment, the polymeric substrate is typically rinsed with deionized water to remove residual contaminants.

In one embodiment, a suitable polymeric substrate is modified by placing the substrate in a high pressure vessel, such as a high pressure vessel commercially available from CF Tech., Inc. Suitable polymeric substrates include those that are formed, at least partially, of a polymer that can react with a fluorinated compound, or that can be modified for reaction with a fluorinated compound. Suitable polymeric substrates include natural and unnatural polymeric fibers, for example, substrates that are formed of polyethylene terephthalate, nylon 66, rayon, cotton, wool, and silk.

The polymeric substrate is exposed within the extraction vessel to a suitable fluorinated compound and a suitable dense gas. Suitable fluorinated compounds are those that can bind to the polymeric substrate. Typically, the fluorinated compound can bind to the polymeric substrate by a chemical interaction. Preferably, the chemical interaction is the formation of a covalent bond between the fluorinated compound and a functional group of the polymeric substrate. An example of a fluorinated compound is a fluorinated hydrocarbon. Preferably, the fluorinated compound is a fluorinated polyether. In a preferred embodiment, the fluorinated compound is a perfluorinated compound. Examples of particularly preferred perfluorinated polyethers include Fomblin® Z-DISOC, having a chemical formula of $OCN—C_6H_3(CH_3)—NH—CO—CF_2(OC_2F_4)_p(OCF_2)_q—OCF_2,CO—NH—C_6H_3(CH_3)—NCO$, which has a reactive isocyanate functionality and the monoacid having a chemical formula of $CF_3CF_2(OC_2F_4)_p(OCF_2)_q—OCF_2—COOH$, which has a reactive carboxylic acid functionality.

Suitable dense gases are those that can facilitate reaction of a fluorinated compound with a polymer of the polymeric substrate. Examples of suitable dense gases are carbon dioxide and sulfur hexafluoride. The dense gas may be a supercritical fluid. An example of a suitable supercritical fluid is carbon dioxide at a temperature and pressure that are supercritical for carbon dioxide. An example of another suitable supercritical fluid is sulfur hexafluoride at a temperature and a pressure that are supercritical for sulfur hexafluoride. Although the method of the invention is not to be limited to any particular theory, it is believed that exposure of the polymeric substrate to a dense gas increases the likelihood that a fluorinated compound will react with a functional group of the polymeric substrate. In particular, it is believed that the dense gas acts as a solvent and transports the fluorinated compound into the polymer where the fluorinated compound reacts with the polymer. It is also believed that the likelihood of reaction between a fluorinated compound and a polymer of the polymeric substrate can be increased by swelling the polymeric substrate and thereby increasing exposure of the polymer to the fluorinated compound.

Suitable liquified compositions that are gaseous at room temperature and about 1 ATM are carbon dioxide, sulfur hexafluoride, and freons, such as chlorocarbons, chlorofluorocarbons, and hydrofluorocarbons.

It is to be understood that the polymeric substrate can be exposed to the fluorinated compound and the dense gas in any order. For example, the polymeric substrate can be placed in a vessel, followed by introduction of the fluorinated compound to the vessel and, subsequently, the dense gas can be introduced to the vessel. Alternatively, the fluorinated compound can be combined with a dense gas and, thereafter, the combined fluorinated compound and dense gas can be directed into the extraction vessel containing the polymeric substrate. In still another alternative, the fluorinated compound and a suitable material, such as carbon dioxide, can be directed into the vessel. Subsequently, the temperature and pressure within the vessel can be adjusted to a temperature and pressure that would increase the density of the gas from what it would be at standard temperature and pressure. The temperature and pressure preferably are increased to a temperature and pressure that are supercritical for the carbon dioxide, whereby the carbon dioxide becomes a suitable supercritical fluid. It is to be understood that other schemes for combining a polymeric substrate with a fluorinated compound and a dense gas can be employed without departing from the scope of the invention.

It is also to be understood that the concentrations of the fluorinated compound and the dense gas to which the polymeric substrate is exposed can be adjusted to control the amount of fluorinated compound that binds to the polymeric substrate and to control the rate at which the fluorinated compound binds to the substrate.

The period of time during which the polymeric substrate is exposed to the fluorinated compound and dense gas is for sufficient time to cause at least a portion of the fluorinated compound to bind to the polymeric substrate. Generally, the polymeric substrate is exposed to the fluorinated compound and the dense gas for a period of time less than three hours.

Preferably, the polymeric substrate is exposed to the fluorinated compound and the dense gas for a period of time less than about thirty minutes.

Following exposure to the fluorinated compound and the dense gas, the polymeric substrate is separated from the dense gas and remaining fluorinated compound by degassing the vessel containing the polymeric substrate. Optionally, the polymeric substrate can then be rinsed with a suitable solvent, such as 2,2,2-trifluoroethanol, HT55, HT70, HT90, or a dense gas. "HT-55," "HT-70," and "HT-90," as employed herein, refer to fluorinated compounds each of which has a chemical formula of $CF_3[(CFCF_3CF_2O)_p(CF_2O)_q]CHF_3$.

In a particular aspect of the invention, the fluorinated compound can be bound selectively to the surface of the polymeric substrate. The selective binding is achieved, for example, by using sulfur hexafluoride as the dense gas.

In a further aspect of the invention, the fluorinated compound can be bound at one or more depths below the surface of the polymeric substrate. The binding of the fluorinated compound at one or more depths below the surface of the polymeric substrate is achieved, for example, by using carbon dioxide as the dense gas. The binding can, in addition, take place at the surface. In a preferred embodiment of this aspect of the invention, the depth or depths at which the fluorinated compound is bound is controlled, for example, by adjusting the temperature and pressure and period of exposure. Binding the fluorinated compound at a depth below the surface of the polymeric substrate is useful in providing wearability to the modification of the polymeric substrate in that fluorinated compound will remain when the surface of the polymeric substrate is worn away.

In a particularly preferred embodiment of the invention, the polymeric substrate is polyethylene terephthalate ("PET"), the dense gas is carbon dioxide at a temperature and pressure that are supercritical for carbon dioxide, and the fluorinated compound is Fomblin® Z-DISOC. The PET is first exposed to a boiling aqueous solution of 0.05 percent NaOH for a period of about thirty minutes. Subsequently, following removal of the aqueous caustic solution, the polymeric substrate is exposed to supercritical carbon dioxide at a temperature of about 60° C. and a pressure of about 2,100 psig for a period of about sixty minutes. The volume of the vessel employed is about 188 cubic centimeters and the amount of Fomblin® Z-DISOC directed into the extraction vessel is about 0.5 milliliters. The extraction vessel is then degassed.

In another preferred embodiment, the polymeric material is nylon 66. The nylon 66 is exposed to a boiling aqueous 0.05 percent NaOH solution at atmospheric pressure for a period of about sixty minutes. Subsequently, the nylon 66 is placed in an extraction vessel into which 0.5 milliliters of Fomblin® Z-DISOC is directed. The nylon 66 is then exposed to carbon dioxide at a temperature of about 60° C. and a pressure of about 2,100 psig for a period of about sixty minutes. The extraction vessel is subsequently degassed.

In still another preferred embodiment, the polymeric substrate is exposed to sulfur hexafluoride at a temperature of at least about 45° C. and a pressure of at least about 500 psig.

The invention will now be further described by the following example. All parts and percentages are by weight unless otherwise specified.

EXEMPLIFICATION

I. Calculation of Surface Energy

The repellency of liquids by a solid substrate can be determined by measuring contact angles (θ) between various liquids and the substrate. The results of treatment by the method of this invention were evaluated by obtaining contact angle data and determining the interfacial tension, or surface free energy, of the treated polymeric material. The lower the solid surface free energy ("$\gamma_s$"), the greater the water repellency. The product is evaluated utilizing a laser goniometer.

To calculate dispersion and polar components of the surface free energy of the surface of the polymeric material, the contact angle data were analyzed according to a model for low energy surfaces developed by D. K. Owens and R. C. Wendt, J. Appl. Polym. Sci., 1969, 13, 1741, and D. H. Kaelble, J. Adhesion, 2, 66, (1970), "Physical Chemistry of Adhesion," Ch. 5, Wiley-Interscience, New York, 1971. This analysis technique is summarized in Equations (1–5):

$$\gamma_L=\gamma_L^d+\gamma_L^p \tag{1}$$

$$\gamma_S=\gamma_S^d+\gamma_S^p \tag{2}$$

$$W_a=\gamma_L(1+\cos\theta) \tag{3}$$

$$W_a=2[(\gamma_L^d\gamma_S^d)^{1/2}+(\gamma_L^p\gamma_S^p)^{1/2}] \tag{4}$$

where $\gamma_L$=liquid-vapor surface free energy, $\gamma_S$=solid-vapor surface free energy, $\gamma_L^d$,$\gamma_L^p$=the respective dispersion and polar components of $\gamma_L$; $\gamma_S^d$,$\gamma_S^p$=the respective dispersion and polar components of; $\gamma_S$; $W_a$=liquid-solid nominal work of adhesion; θ=liquid-solid contact angle. From Equations (3) and (4) the following relationship is derived:

$$1+\cos\theta=2/\gamma_L[(\gamma_L^d\gamma_S^d)^{1/2}+(\gamma_L^p\gamma_S^p)^{1/2}] \tag{5}$$

By using the experimental values of θ measured for two different liquids of defined $\gamma_L^d$ and $\gamma_L^p$ in equation (5), two simultaneous equations were obtained which were solved for unknown surface components $\gamma_S^d$ and $\gamma_S^p$. The sum of these components, according to Equation (2), yielded a reasonable approximation of the total solid surface free energy $\gamma_S$.

In the present study, Equation (5) was applied with the contact angle data of water and methylene iodide. These test liquids were utilized because they have widely differing surface free energy properties. The surface free energy of the liquids at room temperature used for calculations were obtained from D. H. Kaelble, J. Adhesion, 2, 66, (1970), "Physical Chemistry of Adhesion," Ch. 5, Wiley-Interscience, New York, 1971, and were as follows: for water, $\gamma_L^d$=21.8, $\gamma_L^p$=51.0 and $\gamma_L$=72.8 erg/cm$^2$; and for methylene iodide, $\gamma_L^d$=48.5, $\gamma_L^p$=2.3 and $\gamma_L$=50.8 erg/cm$^2$.

II. Determination of Optimum Conditions for Generating Reactive Chain Ends

PET and nylon 66 were treated with base and with acid for different durations to determine the optimum conditions for generating reactive chain ends in the polymeric material. An increase in surface free energy ($\gamma_S$) indicated an increase in the presence of reactive chain ends.

Table 1 shows the surface free energy for PET and nylon 66 after exposure to boiling aqueous 0.05% NaOH. The surface free energy measured after this treatment dramatically increased. These results showed that the number of reactive chain ends were maximized with polymeric material PET exposure to boiling 0.05% NaOH for 30 minutes, and with nylon 66, by exposure to boiling 0.05% NaOH for 60 minutes.

TABLE 1

| PET | θ($CH_2I_2$) | θ($H_2O$) | γs |
|---|---|---|---|
| control | 32 | 86 | 43.5 |
| 30 min. | 93 | 29 | 75.0 |
| 60 min. | 93 | 45 | 59.8 |
| 90 min. | 78 | 38 | 60.9 |
| 120 min. | 90 | 53 | 55.2 |
| 150 min. | 47 | 45 | 54.4 |
| Nylon 66 | θ($CH_2I_2$) | θ($H_2O$) | γs |
| control | 44 | 77 | 39.0 |
| 30 min. | 89 | 38 | 64.9 |
| 60 min. | 94 | 21 | 81.5 |
| 90 min. | 94 | 31 | 73.9 |
| 120 min. | 93 | 23 | 79.5 |
| 150 min. | 93 | 22 | 80.2 |

III. Procedure

Clean PET and nylon 66 coupons were exposed to boiling aqueous 0.05% NaOH for 30 minutes and 60 minutes, respectively. A coupon and Fomblin® Z-DISOC were introduced into a high pressure vessel having an internal volume of 188 $cm^3$, which was then loaded with carbon dioxide.

Table 2 shows the results at the stated temperatures and pressures, utilizing 0.05 ml Fomblin® Z-DISOC for batches 2, 3, 4, and 9; HT-55 for batch 5; HT-70 for batch 6; and HT-90 for batch 7 as the fluorinated compounds. Batches 1 and 8 were controls.

TABLE 2

| Batch No. | Polymeric Material | Pressure psig | Temperature (deg.C.) | Treatment time (min.) | Degas Time (min.) | θ($CH_2I_2$) | θ($H_2O$) | γs crg/cm2 |
|---|---|---|---|---|---|---|---|---|
| 1 | CONTROL PET | | | | | 32 | 86 | 43.5 |
| 2 | PET | 2,000 | 100 | 30 | 3 | 90 | 92 | 17.7 |
| 3 | PET | 2,500 | 100 | 60 | 3 | 62 | 92 | 27.7 |
| 4 | PET | 2,100 | 60 | 60 | unknown | 93 | 95 | 15.9 |
| 5 | PET | 1,000 | 150 | 30 | 3 | 7.3 | 9.7 | 17.0 |
| 6 | PET | 2,000 | 100 | 30 | 3 | 8.2 | 9.9 | 18.1 |
| 7 | PET | 1,000 | 150 | 60 | 3 | 4.3 | 17.7 | 22.0 |
| 8 | CONTROL NYLON66 | | | | | 44 | 77 | 39.0 |
| 9 | NYLON66 | 2,100 | 60 | 60 | unknown | 92 | 94 | 16.5 |

All batches except the controls had a thin layer of polymer coating observed through visual examination. The lowered surface energy is attributable to the perfluoropolyether coating on top of the PET and nylon 66.

IV. Summary and Conclusions

According to these results, a new process has been successfully developed to modify the properties of polymers, such as PET and nylon 66.

EQUIVALENTS

Those skilled in the art will recognize, or be able to ascertain using no more than routine experimentation, many equivalents to specific embodiments of the invention described specifically herein. Such equivalents are intended to be encompassed in the scope of the following claims.

We claim:

1. A method of modifying a polymeric substrate, comprising contacting the polymeric substrate with a fluorinated compound and a dense gas, whereby the fluorinated compound chemically binds to the polymeric substrate, thereby modifying the polymeric substrate.

2. The method of claim 1, wherein the dense gas includes sulfur hexafluoride.

3. The method of claim 2, wherein the sulfur hexafluoride is at a temperature and a pressure that are supercritical for sulfur hexafluoride.

4. The method of claim 3, wherein the fluorinated compound is bound to a surface of the polymeric substrate.

5. The method of claim 1, wherein the dense gas includes carbon dioxide.

6. The method of claim 5, wherein the carbon dioxide is at a temperature and a pressure that are supercritical for carbon dioxide.

7. The method of claim 5, wherein the polymeric material is contacted with the fluorinated compound and the carbon dioxide at a temperature of at least about 60° C.

8. The method of claim 5, wherein the polymeric material is contacted with the fluorinated compound and the dense gas at a pressure of at least about 2,100 psig.

9. The method of claim 1, wherein the polymeric material is contacted with the fluorinated compound and a dense gas for less than about three hours.

10. The method of claim 1, wherein the polymeric material is contacted with the fluorinated compound and the dense gas for less than about thirty minutes.

11. The method of claim 1, wherein the polymeric substrate includes nylon 66.

12. The method of claim 1, wherein the polymeric substrate includes polyethylene terephthalate.

13. The method of claim 1, wherein the fluorinated compound is a fluorinated hydrocarbon.

14. The method of claim 13, wherein the fluorinated compound is a fluorinated polyether.

15. The method of claim 14, wherein the fluorinated compound is a perfluorinated polyether.

16. The method of claim 1, wherein the fluorinated compound includes at least one reactive end functionality.

17. The method of claim 16, wherein the reactive end functionality is diisocyanate.

18. The method of claim 16, wherein the reactive end functionality is carboxylic acid.

19. The method of claim 1, wherein the fluorinated compound is a monofunctional linear polymer.

20. The method of claim 1, wherein the fluorinated compound is a difunctional linear polymer.

21. The method of claim 5, whereby the modification of the polymeric substrate results from binding the fluorinated compound to a surface of the polymeric substrate and below the surface of the polymeric substrate.

22. The method of claim 21, whereby the modification is controlled such that the fluorinated compound binds at a selected depth below the surface of the polymeric substrate.

23. A method of modifying a polymeric substrate, comprising contacting the polymeric substrate with a fluorinated compound and carbon dioxide at a temperature and a pressure that are supercritical for carbon dioxide, whereby the fluorinated compound chemically binds to the polymeric substrate, thereby modifying the polymeric substrate.

24. The method of claim 23, wherein the temperature at which the contact is made is at least about 60° C.

25. The method of claim 24, wherein the pressure at which the contact is made is at least about 2,100 psig.

26. The method of claim 25, wherein the polymeric substrate is contacted with the fluorinated compound and carbon dioxide for a period of time of less than about thirty minutes.

27. A method of modifying a polymeric substrate, comprising the steps of:

a) generating at least one reactive chain end on the polymeric substrate; and b) contacting the polymeric substrate with a fluorinated compound and carbon dioxide at a temperature and a pressure that are supercritical for carbon dioxide, whereby the fluorinated compound reacts with the reactive chain end, thereby modifying the polymeric substrate.

28. The method of claim 27, wherein the reactive chain end is generated by exposing the polymeric substrate to an aqueous caustic solution.

29. The method of claim 28, wherein the polymeric substrate is polyethylene terephthalate and the polymeric substrate is exposed to the aqueous caustic solution for a period of less than about three hours.

30. The method of claim 28, wherein the polymeric substrate is nylon 66 and the polymeric substrate is exposed to the aqueous caustic solution for a period of less than about thirty minutes.

31. A polymeric composition, comprising:

a) a polymeric substrate; and b) a fluorinated compound that has been chemically bound to said polymeric substrate by contacting the t)olvmcric substrate with the fluorinated compound and a dense gas, whereby the fluorinated compound is bound to at least a portion of the polymeric substrate that is below a surface of said substrate.

32. The polymeric composition of claim 31, wherein the polymeric substrate includes polyethylene terephthalate.

33. The polymeric composition of claim 31, wherein the polymeric substrate includes nylon 66.

34. The polymeric composition of claim 31, wherein the fluorinated compound is a fluorinated hydrocarbon.

35. The polymeric composition of claim 34 wherein the fluorinated compound is a fluorinated polyether.

36. The polymeric composition of claim 35 wherein the fluorinated compound is a perfluorinated polyether.

37. The composition of claim 36, wherein the dense gas is selected from the group consisting of carbon dioxide, sulfur hexafluoride, a chlorocarbon, a chorofluorcarbon, and a hydrofluorcarbon.

38. The composition of claim 34 wherein the dense gas is a freon.

* * * * *

UNITED STATES PATENT AND TRADEMARK OFFICE

CERTIFICATE OF CORRECTION

PATENT NO. : 5,968,654

DATED : October 19, 1999

INVENTOR(S) : Samuel P. Sawan, W. Dale Spall and Hung Chang Lee

It is certified that error appears in the above-identified patent and that said Letters Patent is hereby corrected as shown below:

At Claim 31, line 9, delete "t)olvmcric" and substitute therefor --polymeric--.
At Claim 38, line 28, delete "34" and substitute therefor --36--.

Signed and Sealed this

Twenty-fifth Day of July, 2000

Attest:

Q. TODD DICKINSON

Attesting Officer

*Director of Patents and Trademarks*